United States Patent [19]

Keefe

[11] 3,858,188

[45] Dec. 31, 1974

[54] MULTIPHASE MAGNETIC BUBBLE DOMAIN DECODER

[75] Inventor: George E. Keefe, Montrose, N.Y.

[73] Assignee: International Business Machines Corporation, Armonk, N.Y.

[22] Filed: June 30, 1972

[21] Appl. No.: 267,842

[52] U.S. Cl. 340/174 TF, 340/174 SR, 340/347 DD

[51] Int. Cl. .......................... G11c 11/14, G11c 19/00

[58] Field of Search .. 340/174 TF, 174 SR, 347 DD

[56] References Cited

UNITED STATES PATENTS

| | | | |
|---|---|---|---|
| 3,676,870 | 7/1972 | Bobeck | 340/174 TF |
| 3,689,902 | 9/1972 | Chang et al. | 340/174 TF |
| 3,701,125 | 10/1972 | Chang et al. | 340/174 TF |
| 3,723,985 | 3/1973 | Krupp et al. | 340/174 TF |
| 3,732,551 | 5/1973 | Homma et al. | 340/174 TF |

OTHER PUBLICATIONS

IBM Tech. Disc. Bull., "Read/Write Decoder" by Walker; Vol. 13; No. 11; 4/71; pp. 3472, 3473.

IBM Tech. Disc. Bull. "Two-Dimensional Shift Register for Bubble Domains" by Keefe et al.; Vol. 13; No. 11, 4/71, p. 3294.

IBM Tech. Disc. Bulletin, "Improvement of Data Rate in Cylindrical Domain Devices" by Genovese et al.; Vol. 13; No. 11; 4/71, pp. 3299, 3300.

IBM Tech. Disc. Bulletin, "Read/Write Control" by Walker; Vol. 13; No. 11; 4/71, pp. 3474, 3475.

IBM Technical Disclosure Bulletin "Bubble Domain Decoder" by Chang et al.; Vol. 14; No. 8; 1/72; pp. 2304, 2305.

*Primary Examiner*—Stanley M. Urynowicz, Jr.
*Attorney, Agent, or Firm*—Jackson E. Stanland

[57] ABSTRACT

A multiphase bubble domain decoder having significantly reduced interconnections and requiring a minimum of drivers. Bubble domains are steered in various channels rather than being inhibited in their propagation, thereby leading to reduced power consumption. Decoding is achieved using magnetic overlays and current carrying conductors to provide a steering magnetic field for propagation of domains in selected paths. Domains propagate in accordance with a series of attractive magnetic poles established by the magnetic overlays in response to a reorienting magnetic field in the plane of the magnetic sheet in which the domains exist. Current pulses in the conductors occur at times corresponding to various orientations of the reorienting magnetic field, rather than at only one orientation of the reorienting field as was done in the prior art. This decoder can be used to write information into any one of a number of storage locations and read out information from any one of these storage locations.

10 Claims, 4 Drawing Figures

| CHANNEL SELECTED (REGISTER) | DECODE CURRENT POLARITY-φ2 | DECODE CURRENT POLARITY-φ4 |
|---|---|---|
| 1 | + | + |
| 2 | − | + |
| 3 | + | − |
| 4 | − | − |

MULTIPHASE MAGNETIC BUBBLE DOMAIN DECODER

BACKGROUND OF THE INVENTION

1. Field of the Invention

This invention relates to a decoder for use in bubble domain memories, and more particularly to a multiphase bubble domain decoder.

2. Description of the Prior Art

Magnetic memory systems using bubble domains are known in the prior art. For instance, reference is made to an article by H. Chang et al. entitled "A Self-Contained Magnetic Bubble Domain Memory Chip," which was presented at the IEEE International Solid State Circuits Conference, Philadelphia, Pennsylvania, February 1971. The proceedings of this conference were published by Winner, New York, and this particular presentation appears on page 86 of that publication.

The bubble domain memory system described in the Chang et al. article shows the use of read and write decoding in conjunction with storage locations to provide selective write-in and selective read-out from any of a number of storage locations. Bubble domain generation and sensing are also provided on the same magnetic chip.

U.S. Pat. No. 3,701,125 describes a memory system for magnetic bubble domains in which the decoding function is provided on the magnetic chip. Another patent, U.S. Pat. No. 3,689,902 describes a magnetic memory system having decoding on the magnetic sheet in which the bubble domains exist, and including a means for clearing information selectively from any of the storage locations.

In the prior art, the decoding function is achieved by combining a propagation means with current carrying conductors to provide domain propagation in selective paths, in accordance with the current pulses in the conductors. The magnetic fields established by these currents were used to inhibit bubble domain propagation for a portion of the cycle of the in-plane magnetic drive field used to propagate the domains in the magnetic sheet. However, this has a disadvantage since a relatively large amount of power is required to provide a magnetic field sufficient to overcome the effect of an attractive magnetic pole created by the reorienting magnetic drive field, in order to inhibit movement of the domains.

In these prior art decoders, the decoding function (i.e., selective movement of domains in a plurality of propagation paths) is achieved during only one orientation of the reorienting magnetic drive field. These prior art decoders do provide a significant reduction in the number of interconnections and drivers required in contrast with magnetic storage systems not using decoders. However, further reduction in the number of interconnections and the number of drivers required can be obtained by appreciating the fact that the reorienting magnetic field has a plurality of orientations during which time the decode function can be achieved.

Accordingly, it is a primary object of the present invention to provide an improved decoder for magnetic bubble domain systems which requires only a minimum number of interconnections and drivers.

It is another object of this invention to provide an improved decoder for magnetic bubble domain systems which requires only a minimum amount of input power.

It is a further object of this invention to provide a multiphase decoder for bubble domain memory systems.

BRIEF SUMMARY OF THE INVENTION

A magnetic sheet in which domains can be generated and propagated has a plurality of storage positions therein defined by overlay propagation elements adjacent the magnetic sheet. These overlay elements are generally comprised of soft magnetic material which can be deposited on the magnetic sheet or be located on a substrate which is in juxtaposition to the magnetic sheet. A reorienting magnetic field in the plane of the magnetic sheet provides attractive magnetic poles for movement of domains in the magnetic sheet. In addition, a bias field is generally provided normal to the magnetic sheet for stabilization of the size of the domains within the magnetic sheet.

Associated with the various storage locations is a decoding means which is used to provide domain patterns to selective storage locations (write decoder) and to remove domain patterns from selective storage locations (read decoder). The decoders are interwoven with the storage locations and comprise current carrying conductors which thread through various propagation paths in the storage location. Depending upon the presence and absence of current in these conductors, domains will be routed into one of a plurality of paths. Only when the proper sequence of current pulses is present in the conductors will the domains in a selected storage location be allowed to propagate to a sensing element (read decoder use). Domains in non-selected storage locations will be recirculated in their respective storage locations. When the decoder is used as a write decoder, it will direct information to only one selected storage area at a time, while sending to annihilators information associated with non-selected registers.

The current carrying conductors used for decoding are located such that domain propagation in selected paths occurs for various orientations of magnetic drive field. That is, domains are routed into one of a number of alternate propagation paths at different times during a single rotation of the reorienting magnetic drive field. This is in contrast with the prior art decoders where the propagation path selection step always occurs at only one orientation of the magnetic drive field, in all parts of the decoder. For instance, if the magnetic drive field has four orientations spaced 90° apart, a four-phase decoder in accordance with the present invention can be provided in which propagation path selection will occur at all four orientations of the drive field.

The prior art decoders provided a reduction in a number of drivers required. For instance, for $2^N$ storage locations, 2N interconnections and 4N drivers were required. With the present decoder, the number of interconnections and the number of drivers is reduced by $1/\phi$, where $\phi$ is the number of phases of drive field utilized. For instance, in the four phase decoder described in the previous paragraph, the number of interconnections would be reduced to (2N)(¼) while the number of drivers would be reduced to 4N(¼).

In further contrast with prior art decoders, the current carrying conductors in the present decoder provide magnetic fields which are used to steer the magnetic domains to selected propagation paths, rather than inhibiting domain propagation during portions of magnetic drive field rotation. That is, domains in the present decoder always move in response to a reorientation of the magnetic drive field. This means that lesser amounts of power are required in this decoder than in the prior art decoders.

These and other objects, features, and advantages will be more apparent in the following more particular description of the preferred embodiments.

DETAILED DESCRIPTION OF THE PREFERRED EMBODIMENTS

Figure 1:
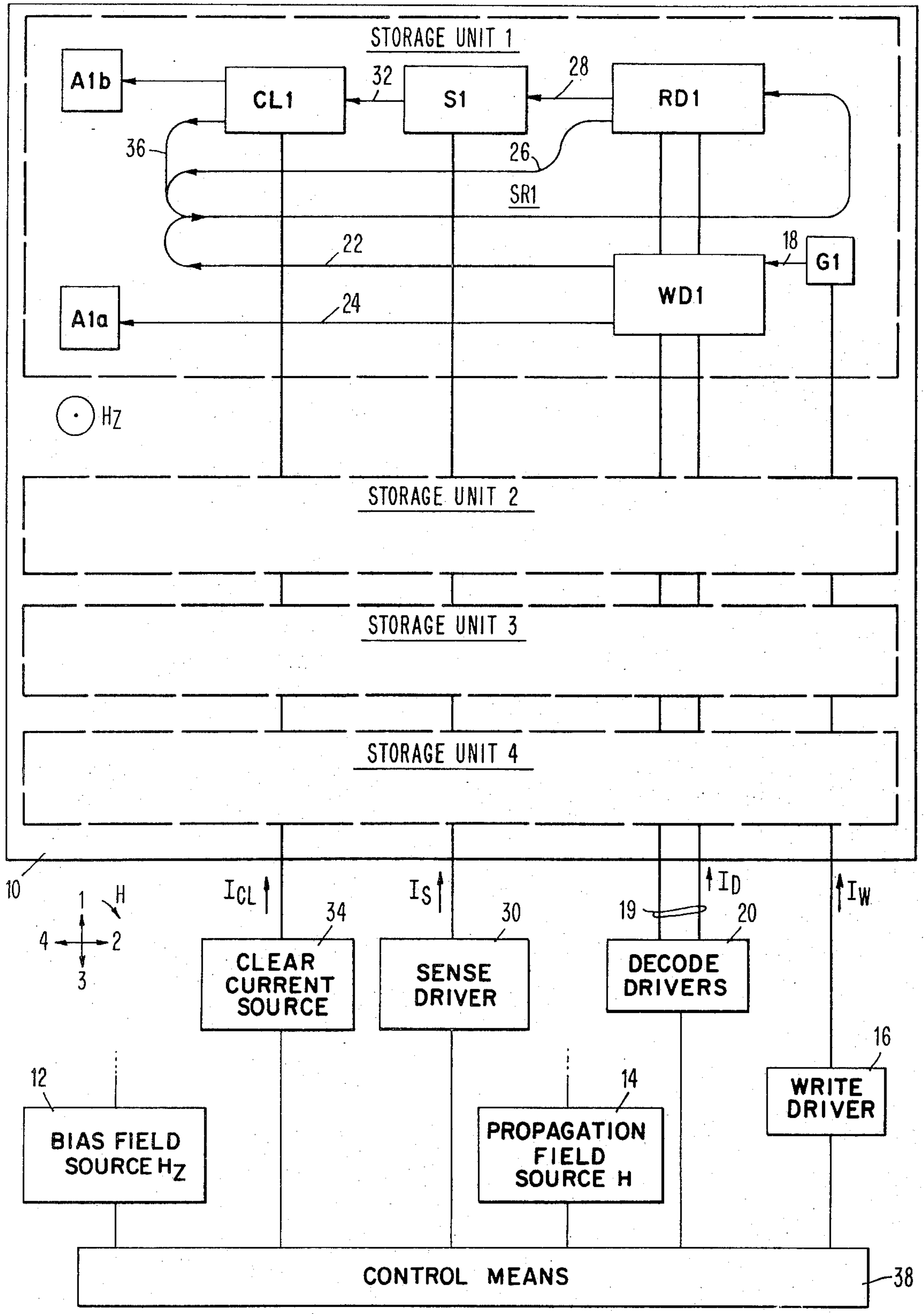
FIG. 1 is a block diagram showing a plurality of storage units each of which has a write and read decoder for selective addressing of information in the storage unit.

FIG. 1 shows a block diagram of a bubble domain memory having four storage units. This number is entirely arbitrary, and any number of units can be provided. All storage units are the same, and only storage unit 1 is shown in some detail in this figure.

The storage units comprise overlays located in proximity to sheet 10 in which the domains exist. Magnetic sheet 10 is any of a plurality of well-known materials for bubble domains, including garnet films and orthoferrite films. Bias field source 12 produces a magnetic field $H_z$ normal to sheet 10 for stabilizing the size of the domains. Bias field source 12 can be a coil surrounding sheet 10 or a permanent magnet, as is known in the art.

A propagation field source 14 provides a reorienting magnetic field H in the plane of sheet 10 for moving domains in sheet 10. In FIG. 1, propagation field H is shown as a rotating magnetic field.

Storage unit 1 is comprised of a domain generator G1, a write decoder WD1, a storage location (shift register SR1), a read decoder RD1, a sensor S1, a clear means CL1, and annihilators A1*a* and A1*b*.

Domains are generated by generator G1 in accordance with current pulses $I_w$ received from write driver 16. These currents either collapse the domains or allow them to pass to write decoder WD1, via the path indicated by arrow 18. Depending upon the currents $I_D$ in lines 19 provided to write decoder WD1 by decode drivers 20, domains will either go to storage means SR1 via path 22, or to annihilator A1*a* via path 24.

After circulation in storage loop SR1, domains enter read decoder RD1. Depending upon the currents $I_D$ (in lines 19) from decoder drivers 20, the domains will then recirculate in register SR1 via path 26, or travel to sensor S1 via path 28.

The sensor S1 can be any conventional sensor, such as a magnetoresistive sensor which utilizes measuring current $I_s$ from sense driver 30. This type of sensor is well known in the art, and reference is made to an article by G. S. Almasi et al. which appears in the Journal of Applied Physics, Vol. 42, No. 4, Page 1,268, (1971).

After being sensed by sensor S1, domains propagate via path 32 to a clear means CL1. Depending upon the current $I_{CL}$ from clear current source 34, the domains will either be sent to annihilator A1*b* or be returned to the shift register SR1 via path 36.

All storage units in FIG. 1 have the same components as storage unit 1. In addition, all storage units work in the same manner. Depending upon the decode inputs to the write and read decoders of the storage units, a single shift register will be selected for receipt of information from generators G1–G4, and a single shift register will be selected for readout of information to sensors S1–S4.

This type of operation is known in the art, and reference is made to aforesaid copending application Ser. No. 103,046. In FIG. 1, control means 38 provides inputs to clear current source 34, sense driver 30, decode drivers 20, write driver 16, and the magnetic field sources 12 and 14. Thus, all operations of this memory are synchronized.

The present invention is concerned with an improved decoder circuit in which multiphase decoding is utilized. That is, the decoding function which allows selection of any single register for selective write and read occurs at various phases of the reorienting magnetic field H.

FIGURE 2

Figure 2:
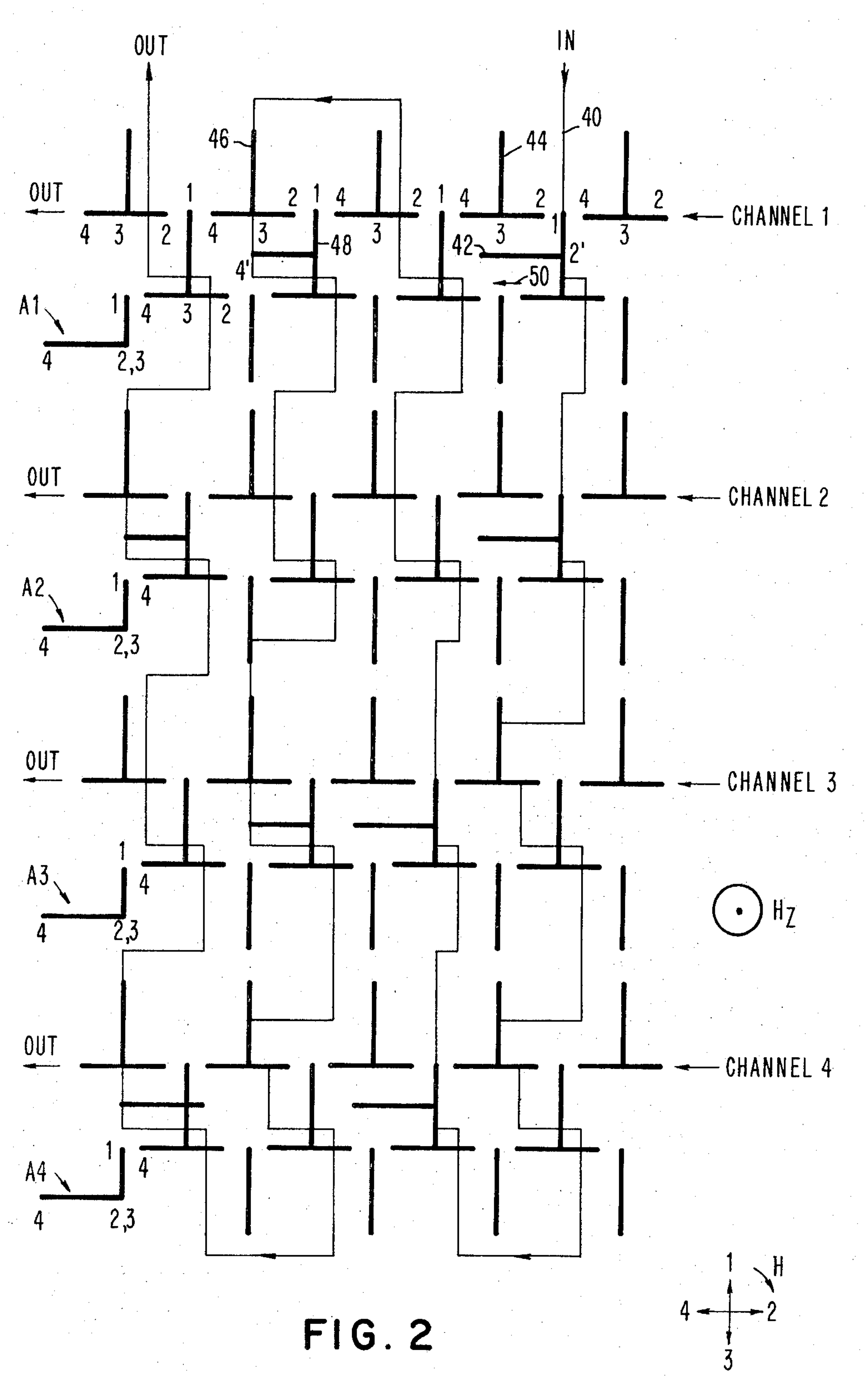
FIG. 2 shows a multiphase (two phase) decoder for storage units.

FIG. 2 is a multiphase decoder suitable for use in the circuit of FIG. 1. In FIG. 2, a two-phase decoder is shown although it should be understood that any number of phases of the rotating magnetic drive field H can be used. This magnetic sheet 10 is not shown here for reasons of simplicity. In FIG. 2, the decoding function occurs twice during a single rotation of the drive field H. In particular, this function occurs at phases 2 and 4 of the drive field rotation.

The decoder of FIG. 2 can be used as either a write decoder or a read decoder. It is comprised of four separate channels 1, 2, 3, and 4 which provide propagation paths for the bubble domains. Crossing the propagation paths of each channel is a single conductor 40 which carries a current from decode drivers 20 in order to provide selective passage of domains from an input to an output in only one channel at a time.

Currents appear in conductor 40 at two times during each rotation of magnetic drive field H. The first current pulse occurs when drive field H goes to direction 2 while the second current pulse occurs when drive field H goes to direction 4. In each case, the current pulse in conductor 40 stays on for a period of time less than or equal to ¼ of the cycle of drive field H. For instance, when H goes to direction 2, current appears in conductor 40. This current pulse lasts until drive field H moves to position 3. The decode current in line 40 is used to provide a magnetic field which steers domains into one of two alternate paths.

In more detail, FIG. 2 will be described with reference to FIG. 3, which shows a truth table for selection of any register 1–4 associated with a channel 1–4, respectively.

Figures 3, 4:
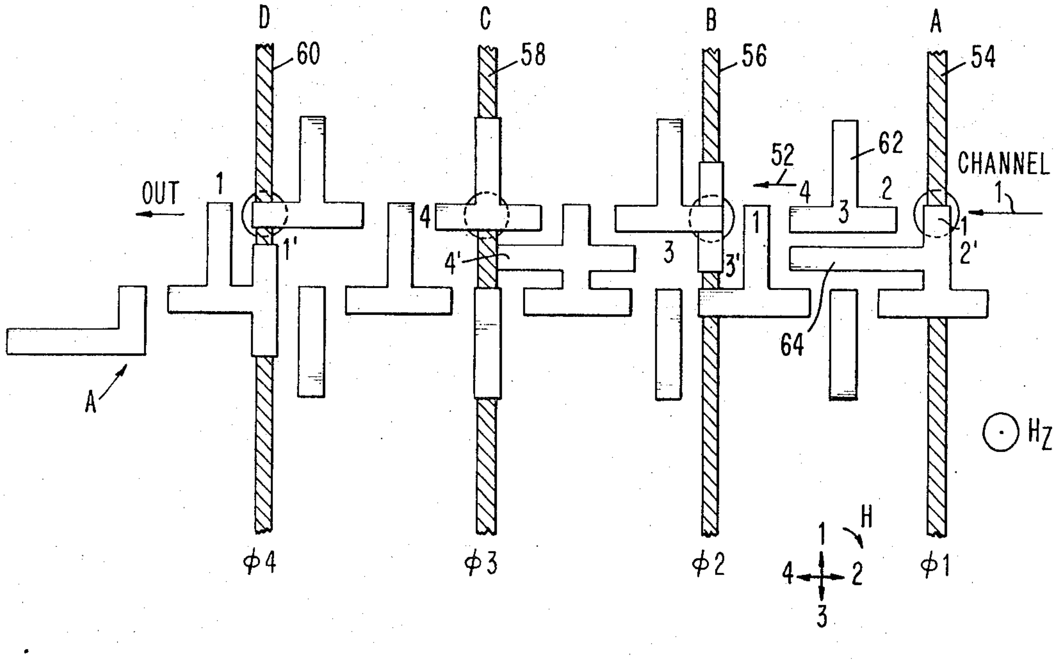
FIG. 3 shows the truth table for operation of the decoder of FIG. 2.
FIG. 4 illustrates the conductor lines for a four-phase decoder.

For instance, FIG. 3 notes that domain information will propagate in channel 1 to the output of this channel if the current pulses in conductor 40 at phases 2 and 4 of drive field H are both positive (i.e., in a downward direction from the input to conductor 40). This combination of two positive currents in conductor 40 will not allow domains in any other channel to reach their respective outputs. Instead, the domains in the other channels 2–4 will be propagated to annihilators A2, A3, and A4, respectively.

To select register 1 for passage of domains along channel 1, two positive currents exist in line 40 at two different times. The first current pulse occurs when domains are located at pole position 1 of overlay element 42. This current pulse produces a magnetic field which lessens the effect of the bias field $H_z$ on the left-hand side of conductor 40, causing domains in channel 1 to propagate to pole position 2 of T-bar 44, rather than to position 2' of permalloy element 42.

When the domains reach T-bar 46, a positive pulse in conductor 40 will cause the domains to move to pole position 4 of T-bar 46, rather than to pole position 4' of element 48. Thus, the domains will propagate to the output of channel 1 in response to positive pulses during phases 2 and 4 of drive field H.

For any other combination of current pulses in conductor 40, domains will not be allowed to propagate from the input of channel 1 to the output of this channel. For instance, a negative going current at phase 2 of the rotating magnetic drive field will cause the domains in channel 1 to propagate from pole position 1 of element 42 to pole position 2' of that element, rather than to pole position 2 of element 44. Domains which have moved to pole position 2' on element 42 will then propagate in the direction of arrow 50 to an annihilator A1. During the rotation of in-plane magnetic field H, the domains will become trapped at the elbow of annihilator A1 and will be collapsed when propagation field H rotates to position 4.

Information in each of the channels is propagated in the same way through the decoder of FIG. 3. Depending upon the inputs through conductor 40 at phases 2 and 4 of the magnetic drive field, domains will either propagate from the input of any channel to the output of that channel, or propagate to an annihilator associated with the channel. Therefore, for any combination of currents supplied during phases 2 and 4 of the rotating drive field, only one channel will have its information moved from its input to its output. In all other channels, the domains will be propagated to an annihilator. Of course, the annihilator could be replaced with other propagation circuitry. It is only important that multiphase decoding be used to provide selective paths for domains in order to provide a decoding function.

As will be noted with respect to the decoder of FIG. 2, the current in conductor 40 is used only to steer the domains. These domains are not inhibited in their motion, but are either sent to one pole or another depending upon the direction of currents in conductor 40, at the particular time the steering choice is to be made.

FIGURE 4

FIG. 4 is an illustration of a portion (channel 1) of a four-phase decoder showing how the conductor lines are utilized at locations corresponding to four-phases of rotating drive field H. That is, current in these decode lines provides a steering field to magnetic domains during magnetic field orientations 1, 2, 3, and 4.

In more detail, only a single portion of the decoder is shown. Domains enter channel 1 from the right and propagate to the left in the direction of arrow 52 when currents in the decode lines 54, 56, 58, and 60 are in the positive direction during magnetic field directions 1, 2, 3, and 4, respectively.

For example, a positive current in conductor 54 during phase 1 (drive field H in direction 1) will cause magnetic pole 2 on T-bar 62 to be more attractive than pole 2' on element 64. Therefore, domains located at pole position 1 of element 64 will propagate to pole position 2 on element 62, rather than going to pole position 2' on element 64.

Currents in conductors 56, 58, and 60 have the same roles as currents in conductor 54. That is, they produce magnetic fields at phases 2, 3, and 4 which guide domains either to the output of this channel or to an annihilator A where they are destroyed.

In FIG. 4, the multiphase decoder uses all four phases of the rotating drive field H. For ease of drawing, the entire decoder was not shown, although one of skill in the art will be able to construct such a decoder, based on the teaching of the present invention.

What has been shown is a multiphase decoder which utilizes the rotation properties of the in-plane magnetic drive field. This multiphase decoder will substantially reduce the number of required interconnections and the number of drivers used. In addition, power requirements will be significantly reduced.

What is claimed is:

1. An apparatus for movement of magnetic bubble domains in a magnetic medium, comprising:

a plurality of propagation paths for movement of said magnetic bubble domains from input positions thereof to output positions thereof, said paths being comprised of magnetic elements for creating successive magnetic poles therealong in response to reorientations of a magnetic drive field, said magnetic poles moving said bubble domains, wherein each said path is comprised of a number of magnetic elements sufficient to insure that said domains will always move to a new magnetic pole location each time said magnetic field reorients, magnetic field means for producing said reorienting magnetic field, the orientations of said magnetic field being produced in repetitive sequences for movement of said domains in synchronism in each said channel, decoder means for detouring domains at a plurality of locations along each said propagation path as said domains move along each said propagation path, said decoder means including means for effecting said detours along each said path at different orientations of said magnetic field.

2. An apparatus for movement of magnetic bubble domains in a magnetic medium, comprising:

a plurality of propagation paths for movement of said magnetic bubble domains from input positions thereof to output positions thereof, said paths being comprised of magnetic elements for creating successive magnetic poles therealong in response to reorientations of a magnetic drive field, said magnetic poles moving said bubble domains, wherein each said path is comprised of a number of magnetic elements sufficient to insure that said domains will always move to a new magnetic pole location each time said magnetic field reorients, magnetic field means for producing said reorienting magnetic field, the orientations of said magnetic field being produced in repetitive sequences for movement of said domains in synchronism in each said channel, decoder means for detouring domains at a plurality of locations along each said propagation path as said domains move along each said propagation path, said decoder means including means for effecting said detours along each said path at different orientations of said magnetic field, where said decoder means is comprised of a current carrying conductor which is adjacent to said magnetic elements.

3. An apparatus for movement of magnetic bubble domains in a magnetic medium, comprising:

a plurality of propagation paths for movement of said magnetic bubble domains from input positions thereof to output positions thereof, said paths being comprised of magnetic elements for creating successive magnetic poles therealong in response to reorientations of a magnetic drive field, said magnetic poles moving said bubble domains, wherein each said path is comprised of a number of magnetic elements sufficient to insure that said domains will always move to a new magnetic pole location each time said magnetic field reorients, magnetic field means for producing said reorienting magnetic field, the orientations of said magnetic field being produced in repetitive sequences for movement of said domains in synchronism in each said channel, decoder means for detouring domains at a plurality of locations along each said propagation path as said domains move along each said propagation path, said decoder means including means for effecting said detours along each said path at different orientations of said magnetic field, where said decoder means is comprised of a current carrying conductor which is adjacent to said magnetic elements, including a current source for providing selected currents in said conductor during each repetitive sequence of said reorienting magnetic field, said selected currents being effective to cause domain detour in a selected propagation path in accordance with the selected currents in said conductor.

4. An apparatus using magnetic bubble domains in a magnetic medium, comprising:

a plurality of information channels, each of which has an input position and an output position, said information channels being used for movement of said magnetic bubble domains from an input position to a corresponding output position, field means for providing a repetitive sequence of magnetic drive fields for moving said domains in synchronism in said information channels, said domains moving to different positions during application of each successive magnetic drive field in said sequence of drive fields, decoder means for changing the direction of movement of said domains in said channels without stopping the motion of said domains in order to effect said change in direction, said domains not stopping during application of successive magnetic drive fields, wherein said decoder means includes means for changing the direction of movement of said domains during application of different magnetic drive fields in said repetitive sequence of drive fields.

5. The apparatus of claim 4, where said decoder means is comprised of a conductor which is adjacent to said information channels.

6. The apparatus of claim 5, where said information channels are comprised of magnetic elements along which said magnetic drive fields are created in response to application of a reorienting magnetic field in the plane of said magnetic medium, and further including magnetic field means for creation of said reorienting magnetic field.

7. An apparatus for manipulating magnetic bubble domains in a magnetic medium, comprising:

a plurality of propagation paths comprised of magnetic elements, each path having plural intersections with two output paths therefrom, said paths being defined by magnetic elements along which successive magnetic poles are created in response to the application of a reorienting magnetic field in the plane of said magnetic medium, there being magnetic elements present in said intersections for movement of domains therethrough.

a magnetic field source for producing said reorienting magnetic field, a decoder means associated with each said intersection for selectively sending domains along one of said output paths from each said intersection, said decoding means including means for sending domains along one of said output paths at said intersections along each said path during different orientations of said reorienting magnetic field, and further means for continually moving said domains through said intersections during successive orientations of said reorienting magnetic field.

8. The apparatus of claim 7, where each said intersection is comprised of identical magnetic elements and said decoder includes a conductor which is adjacent to different positions of said magnetic elements at different intersections.

9. The apparatus of claim 7, where said selection of output paths from said intersections along each said propagation path occurs at different intersections at two different orientations of said magnetic field.

10. The apparatus of claim 7, where said selection of output path from said intersections along each said propagation path occurs at different intersections at four orientations of said magnetic field.

* * * * *